United States Patent
Chu

(10) Patent No.: US 10,985,571 B2
(45) Date of Patent: Apr. 20, 2021

(54) POWER CONVERSION SYSTEM AND OPERATION METHOD THEREOF

(71) Applicant: ELECTRONICS AND TELECOMMUNICATIONS RESEARCH INSTITUTE, Daejeon (KR)

(72) Inventor: Moo Jung Chu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 64 days.

(21) Appl. No.: 16/375,473

(22) Filed: Apr. 4, 2019

(65) Prior Publication Data

US 2019/0312438 A1 Oct. 10, 2019

(30) Foreign Application Priority Data

Apr. 5, 2018 (KR) .......................... 10-2018-0039948

(51) Int. Cl.
*H02J 3/38* (2006.01)
(52) U.S. Cl.
CPC .................................... *H02J 3/385* (2013.01)
(58) Field of Classification Search
None
See application file for complete search history.

(56) References Cited

U.S. PATENT DOCUMENTS

| 8,624,439 | B2 | 1/2014 | Marcianesi et al. |
| 8,716,891 | B2 | 5/2014 | Choi |
| 8,963,373 | B2 | 2/2015 | Gerhardinger et al. |
| 9,608,438 | B2 | 3/2017 | Chu |
| 10,199,880 | B2* | 2/2019 | Takahashi ............... H02J 50/40 |
| 2003/0227219 | A1 | 12/2003 | Beck |
| 2012/0126623 | A1* | 5/2012 | Koehl ..................... H02J 3/381 307/76 |
| 2014/0300488 | A1 | 10/2014 | Yoo et al. |
| 2016/0118925 | A1* | 4/2016 | Kim ......................... B60L 7/14 318/139 |
| 2017/0279302 | A1* | 9/2017 | Toyoda ................... H02J 9/062 |

FOREIGN PATENT DOCUMENTS

KR 10-1097260 B1 12/2011
KR 10-1777230 B1 9/2017

* cited by examiner

*Primary Examiner* — Cassandra F Cox
(74) *Attorney, Agent, or Firm* — Rabin & Berdo, P.C.

(57) ABSTRACT

Provided is a power conversion system. The system includes a DC bus line including a common terminal, a power generation device configured to provide DC power to the common terminal, a first inverter configured to convert a first input power provided from the common terminal into a first AC power and output the first AC power, and a second inverter configured to convert a second input power provided from the common terminal into a second AC power in response to the first input power being greater than a first threshold power while the first inverter operates and output the second AC power.

18 Claims, 10 Drawing Sheets

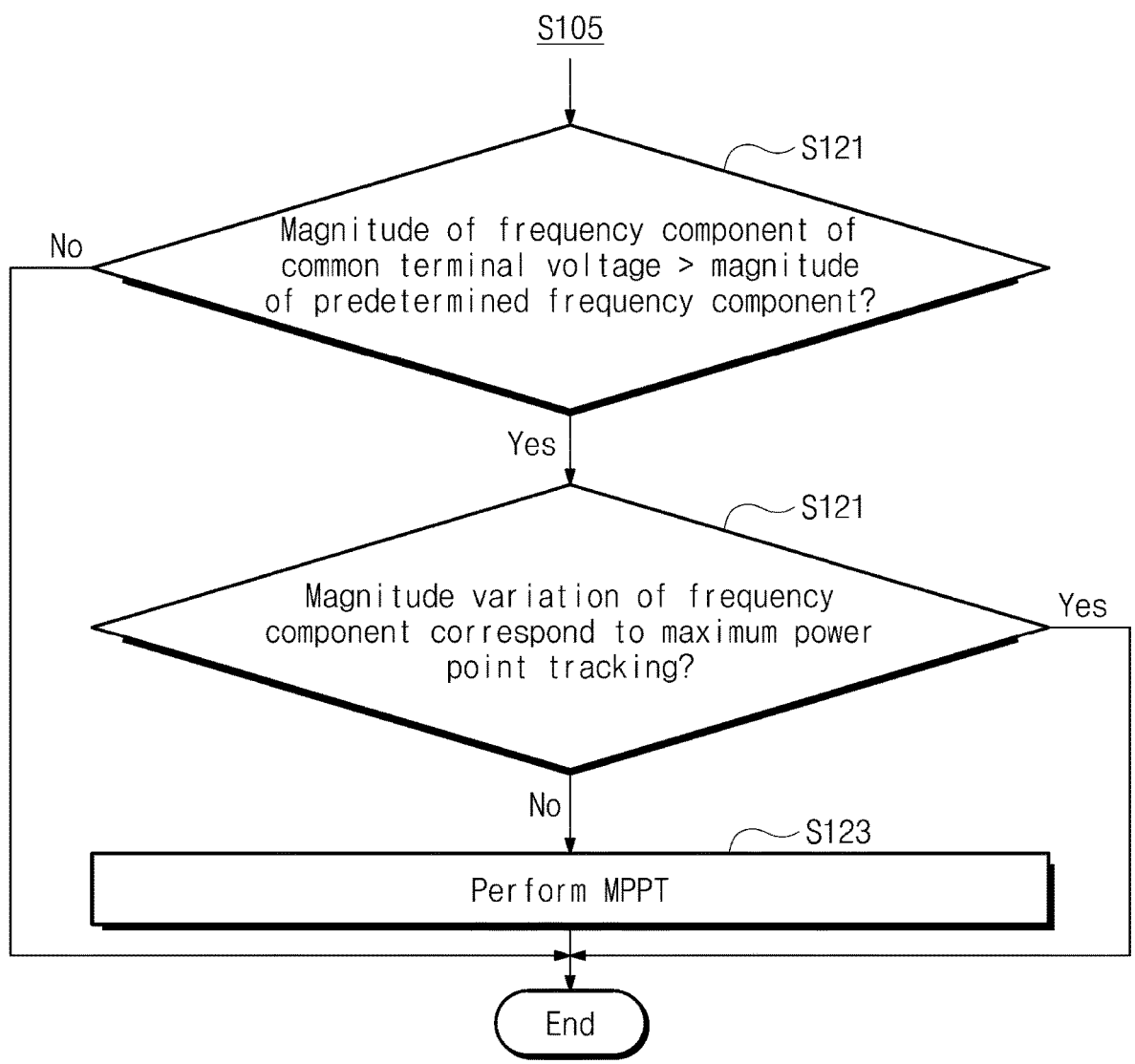

POWER CONVERSION SYSTEM AND OPERATION METHOD THEREOF

CROSS-REFERENCE TO RELATED APPLICATIONS

This U.S. non-provisional patent application claims priority under 35 U.S.C. § 119 of Korean Patent Application No. 10-2018-0039948, filed on Apr. 5, 2018, the entire contents of which are hereby incorporated by reference.

BACKGROUND

The present disclosure herein relates to a power conversion system, and more particularly, to a power conversion system including a plurality of inverters and an operation method thereof.

A power conversion system is used in various fields of power generation systems such as solar power generation system and wind power generation system. In a solar power generation system, the inverter converts the direct current (DC) power produced by the solar panel to alternating current (AC) power. The inverter may be divided into a module-integrated converter (MIC), a string, a multi-string, a central, and a multi-central inverter depending on the combination of solar panels and arrays.

In relation to the MIC, installation is easy in a form of attaching the inverter to each panel, and even when the insolation conditions between panels are different due to differences in shadows or installation conditions, it has the advantage of being able to harvest maximum energy. However, since the power conversion efficiency is somewhat lower than that of a large inverter and a large number of inverters are used in the implementation of a large capacity system, the cost burden may be large.

To solve this problem, a power conversion system for efficiently operating an MIC has been studied. However, different hardware design of the MIC is required with previous methods, there may be difficulties in utilizing an existing MIC.

SUMMARY

The present disclosure is to provide a power conversion system and an operation method capable of improving power conversion efficiency without changing the hardware structure of an existing MIC.

An embodiment of the inventive concept provides a power conversion system including: a DC bus line including a common terminal; a power generation device configured to provide DC power to the common terminal; a first inverter configured to convert a first input power provided from the common terminal into a first AC power and output the first AC power; and a second inverter configured to convert a second input power provided from the common terminal into a second AC power in response to the first input power being greater than a first threshold power while the first inverter operates and output the second AC power.

In an embodiment, when the second input power is smaller than a second threshold power while the first and second inverters operate, the second inverter may stop operating.

In an embodiment, a first start-up voltage of the first inverter may be set to be lower than a second start-up voltage of the second inverter.

In an embodiment, the first inverter may start before the second inverter.

In an embodiment, the first inverter may perform a maximum power point tracking (MPPT) by detecting a common terminal voltage and a first input current provided from the common terminal, wherein the second inverter may perform the MPPT by detecting the common terminal voltage and a second input current provided from the common terminal.

In an embodiment, when the common terminal voltage is higher than a maximum output voltage during a predetermined time or when one of the first or second input currents is increased to a specific magnitude, one of the first and second inverters may determine that the other one of the first and second inverters stops operating.

In an embodiment, when the common terminal voltage is lower than the maximum output voltage during a predetermined time or when one of the first and second input currents is decreased to a specific magnitude, one of the first and second inverters may determine that the other one of the first and second inverters starts operating in a stop state.

In an embodiment, when the common terminal voltage is higher than a first start-up voltage of the first inverter and the common terminal voltage is not changed from an open circuit voltage to a maximum output voltage, the second inverter may determine that the first inverter is start-disabled.

In an embodiment, when the first input power exceeds a second threshold power and the common terminal voltage is maintained at a threshold voltage, the first inverter may determine that the second inverter is start-disabled.

In an embodiment, an execution period of the MPPT of the first inverter and an execution period of the MPPT of the second inverter may be relatively prime.

In an embodiment, at least one of the first and second inverters may determine a variation of the common terminal voltage corresponding to the MPPT based on each execution period of the MPPT, and may not perform any operation in response to the variation.

In an embodiment, the power generation device may be a solar panel.

In an embodiment of the inventive concept, an operation method of a power conversion system including a first inverter and a second inverter includes: detecting, by the first inverter and the second inverter, a common terminal voltage provided to a common terminal of a DC bus line from a power generating device; converting, by the first inverter, a first input power provided from the common terminal into a first AC power and outputting the first AC power according to the common terminal voltage; and converting, by the second inverter, a second input power provided from the common terminal into a second AC power and outputting the second AC power in response to the first input power being greater than a first threshold power while the first inverter operates.

In an embodiment, the first threshold power may be twice a minimum power at which the first inverter operates more than a predetermined efficiency or may be a maximum power at which the first inverter operates more than the predetermined efficiency.

In an embodiment, the method may further include, when the second input power is smaller than a second threshold power, stopping, by the second inverter, operating.

In an embodiment, the second threshold power may be a minimum power at which the second inverter operates more than a predetermined efficiency.

In an embodiment, the first and second inverters may perform maximum power point tracking (MPPT) to output the first AC power and the second AC power, respectively.

In an embodiment, an execution period of the MPPT of the first inverter and an execution period of the MPPT of the second inverter may be relatively prime.

In an embodiment, the method may further include: determining, by at least one of the first and second inverters, a magnitude of a frequency component of the common terminal voltage; when the magnitude of the frequency component of the common terminal voltage is greater than a magnitude of a predetermined frequency component, determining, by at least one of the first and second inverters, whether a magnitude variation of the frequency component corresponds to the MPPT; and when the magnitude variation of the frequency component does not correspond to the MPPT, performing, by at least one of the first and second inverters, the MPPT regardless of an execution period of the MPPT.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 10 is a view illustrating an embodiment for an operation sequence of a power conversion system related to mutual interference avoidance of FIG. 9.

DETAILED DESCRIPTION

Figure 1:
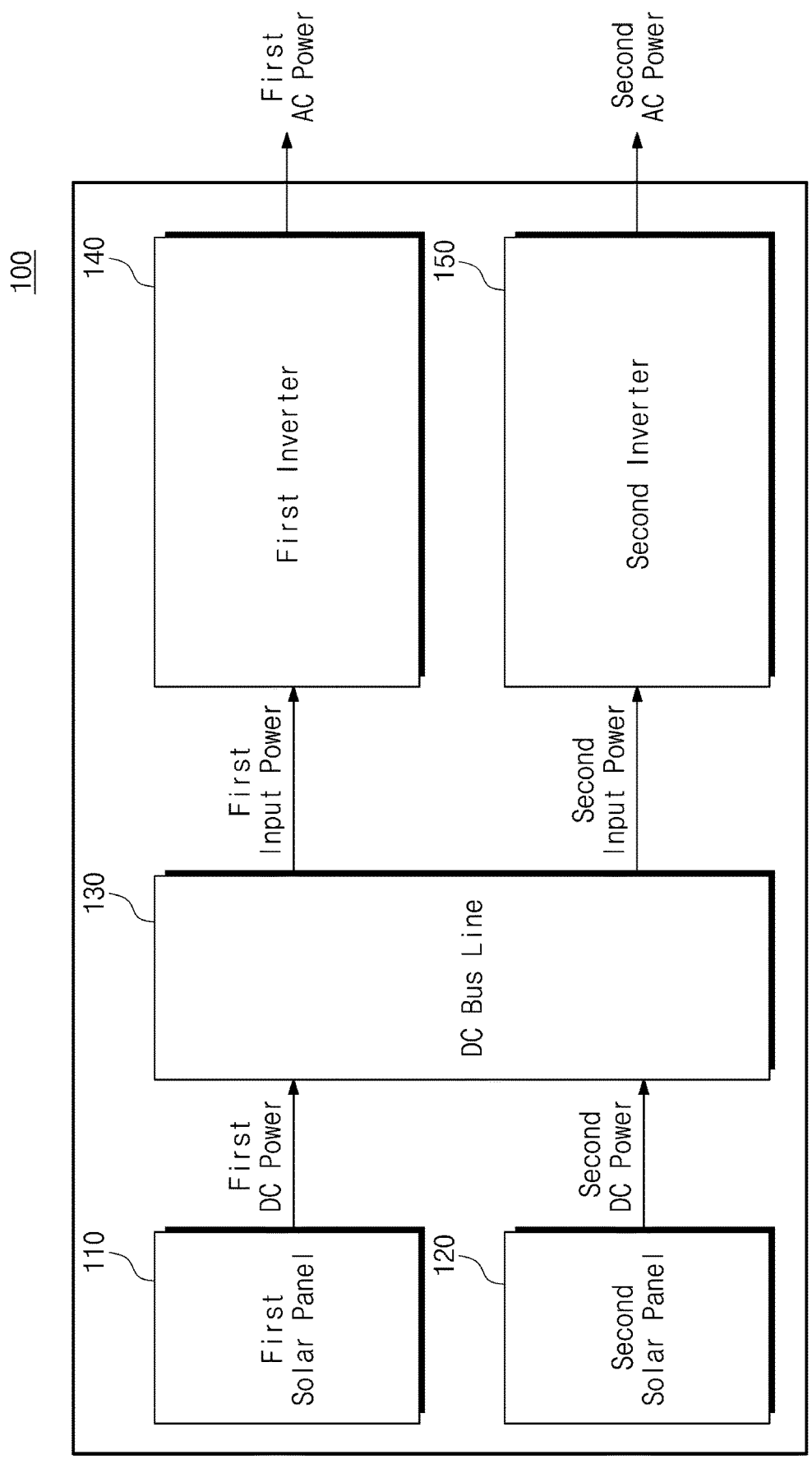
FIG. 1 is a block diagram illustrating a power conversion system according to an embodiment of the inventive concept.

Hereinafter, embodiments of the inventive concept will be described in more detail with reference to the accompanying drawings. In the description below, details such as detailed configurations and structures are simply provided to help overall understanding. Therefore, without departing from the technical idea and scope of the inventive concept, modifications on embodiments described in this specification may be performed by those skilled in the art. Furthermore, descriptions of well-known functions and structures are omitted for clarity and conciseness. The terms used herein are defined in consideration of functions of the inventive concept and are not limited to specific functions. The definition of terms may be determined based on the details in description.

Modules in drawings or detailed description below may be shown in the drawings or may be connected to another component other than components described in detailed description. Each of connections between modules or components may be direct or indirect. Each of connections between modules or components may be a connection by communication or a physical access.

Components described with reference to terms such as parts, units, modules, and layers used in detailed description may be implemented in software, hardware, or a combination thereof. Exemplarily, software may be machine code, firmware, embedded code, and application software. For example, hardware may include an electrical circuit, an electronic circuit, a processor, a computer, an integrated circuit, integrated circuit cores, a pressure sensor, an inertial sensor, microelectromechanical systems (MEMS), a passive device, or a combination thereof.

Unless otherwise defined, all terms including technical or scientific meanings used in the specification have meanings understood by those skilled in the art. In general, the terms defined in the dictionary are interpreted to have the same meanings as contextual meanings and unless they are clearly defined in the specification, are not to be interpreted to have ideal or excessively formal meanings.

The power conversion system according to the embodiment of the inventive concept may be applied to various power generation systems such as a solar power generation system and a wind power generation system. Hereinafter, for convenience of description, it is assumed that the power conversion system according to an embodiment of the inventive concept is applied to the solar power generation system, but the inventive concept is not limited thereto. That is, the solar panel included in the solar power generation system may be one of various kinds of power generation devices.

FIG. 1 is a block diagram illustrating a power conversion system according to an embodiment of the inventive concept. Referring to FIG. 1, a power conversion system 100 includes a first solar panel 110, a second solar panel 120, a DC bus line 130, a first inverter 140, and a second inverter 150. The first solar panel 110 and the second solar panel 120 are connected in parallel through the DC bus line 130, and the first inverter 140 and the second inverter 150 are connected in parallel through the DC bus line 130.

The first solar panel 110 may generate the first DC power based on the incident solar energy and output the generated first DC power. The first solar panel 110 may output the first DC power to the DC bus line 130. The first DC power may vary according to the density of the solar energy incident on the first solar panel 110, and the density of the solar energy may vary according to time and weather conditions.

The second solar panel 120 may generate the second DC power based on the incident solar energy and output the generated second DC power. The second solar panel 120 may output the second DC power to the DC bus line 130. The second DC power may vary according to the density of the solar energy incident on the second solar panel 120, like the first DC power.

For example, when the densities of the solar energy incident on the first solar panel 110 and the second solar panel 120 are the same and the states (for example, the area of the panel, the parts and materials used, the degree of contamination of the panel, etc.) of the first solar panel 110 and the second solar panel 120 are the same, the respective DC powers outputted from the first solar panel 110 and the second solar panel 120 may be the same.

The DC bus line 130 may receive a first DC power from the first solar panel 110 and a second DC power from the second solar panel 120. The DC bus line 130 may receive the first DC power and the second DC power through a common terminal of the DC bus line 130. Accordingly, the DC power, which is the sum of the first DC power and the second DC power, may be provided to the DC bus line 130.

The first inverter 140 may receive the first input power provided through the DC bus line 130 and may convert the first input power into the first AC power. Although not shown in FIG. 1, the first inverter 140 may include a power circuit and a controller required for DC-AC conversion, a sensor for measuring voltage and current for a first input power supplied from a common terminal of the DC bus line 130, and a sensor for measuring the current, voltage, frequency, and phase of the output AC power.

The first inverter 140 may detect a first input voltage (hereinafter referred to as a common terminal voltage because the first input voltage is equal to the common terminal voltage) and a first input current for a first input power supplied from a common terminal, and perform an operation based on the detection result. For example, the first inverter 140 may start operation when the common terminal voltage becomes higher than the first start-up voltage $V1_{in\text{-}start}$. In other words, the first start-up voltage $V1_{in\text{-}start}$ may be a minimum voltage at which the first inverter 140 may start its normal operation in a stopped state.

The first inverter 140 may perform maximum power point tracking (MPPT) so that the first inverter 140 may operate at a maximum power point by detecting the common terminal voltage and the first input current. Accordingly, the first inverter 140 may output the maximum AC power based on the first input power supplied through the DC bus line 130.

The second inverter 150 may receive the second input power provided through the DC bus line 130 and may convert the second input power into the second AC power. Although not shown in FIG. 1, the second inverter 150 may include a power circuit and a controller required for DC-AC conversion, a sensor for measuring voltage and current for a second input power supplied from a common terminal of the DC bus line 130, and a sensor for measuring the current, voltage, frequency, and phase of the output AC power.

The second inverter 150 may detect a second input voltage (hereinafter referred to as a common terminal voltage because the second input voltage is equal to the common terminal voltage) and a second input current supplied from a common terminal, and perform an operation based on the detection result. For example, the second inverter 150 may start operation when the common terminal voltage becomes higher than the second start-up voltage $V2_{in\text{-}start}$. In other words, the second start-up voltage $V2_{in\text{-}start}$ may be a minimum voltage at which the second inverter 150 may start its normal operation in a stopped state.

Illustratively, the first start-up voltage $V1_{in\text{-}start}$ of the first inverter 140 may be set to be lower than the second start-up voltage $V2_{in\text{-}start}$ of the second inverter 150. Accordingly, the first inverter 140 may start to operate before the second inverter 150.

The second inverter 150 may monitor the common terminal voltage and the second input current. The second inverter 150 may determine the operation state of the first inverter 140 based on the change in the common terminal voltage and the second input current without using a separate communication device. For example, the second inverter 150 may determine whether the first inverter 140 starts to operate, stops the operation, or is disabled based on the change in the common terminal voltage and the second input current.

Also, the second inverter 150 may determine the magnitude of the first input power supplied to the first inverter 140 based on the change in the common terminal voltage and the second input current. The second inverter 150 may determine the operation of the second inverter 150 based on the magnitude of the first input power, the operation state of the first inverter 140, and the like. For example, the second inverter 150 may determine operation start and operation stop.

When the first inverter 140 performs an operation alone (hereinafter referred to as an integrated operation), both the first DC power and the second DC power may be provided to the first inverter 140. That is, the first input power may be a sum of the first DC power and the second DC power. When the first inverter 140 and the second inverter 150 perform operations, respectively, (hereinafter referred to as individual operations), the first DC power and the second DC power may be distributed to the first inverter 140 and the second inverter 150. That is, the sum of the first input power and the second input power may be a sum of the first DC power and the second DC power.

When the sum of the first DC power and the second DC power is less than the first threshold power, the first inverter 140 may operate independently to improve the operation efficiency of the inverter. The first threshold power may be the maximum magnitude of the input power that may be maintained above a specified efficiency while the first inverter 140 is operating alone. When the magnitude of the first input power provided to the first inverter 140 is less than the first threshold power, the second inverter 150 may maintain the stop state to improve the operation efficiency of the first inverter 140.

When the sum of the first DC power and the second DC power is greater than the first threshold power, the first inverter 140 and the second inverter 150 may operate separately to improve the operation efficiency of the inverter. When the magnitude of the first input power provided to the first inverter 140 is greater than the first threshold power, the second inverter may start to operate to improve the operation efficiency of the first inverter 140 and the second inverter 150.

When the second inverter 150 starts to operate, the second inverter 150 may perform the MPPT by detecting the common terminal voltage and the second input current. Accordingly, the second inverter 150 may output the maximum AC power based on the second input power supplied through the DC bus line 130.

As described above, the power conversion system 100 according to the embodiment of the inventive concept includes a DC bus line 130 with a common terminal, and a first inverter 140 and a second inverter 150 for converting the DC power outputted through the DC bus line 130 to AC power. The first inverter 140 and the second inverter 150 may detect DC power outputted to the DC bus line 130 without a separate central control device or communication device to determine whether to start or stop the operation.

Accordingly, the power conversion system 100 may not include a separate power line connection part and switch for providing the DC power to the first inverter 140 or the second inverter 150. Alternatively, as only the software of the first inverter 140 or the second inverter 150 is changed without changing the hardware structure of the power conversion system 100, it is possible to perform integrated operation or individual operation. The first inverter 140 and the second inverter 150 may detect DC power outputted to the DC bus line 130 without a separate central control device or communication device to determine whether to start or stop the operation.

Although FIG. 1 shows that the power conversion system 100 includes two solar panels 110 and 120 and two inverters 140 and 150, the invention concept is not so limited. For example, the power conversion system 100 according to an embodiment of the inventive concept may include various numbers of solar panels and various numbers of inverters. Hereinafter, for convenience of description, embodiments will be described based on the power conversion system 100 of FIG. 1 including two solar panels 110 and 120 and two inverters 140 and 150.

Figure 2:
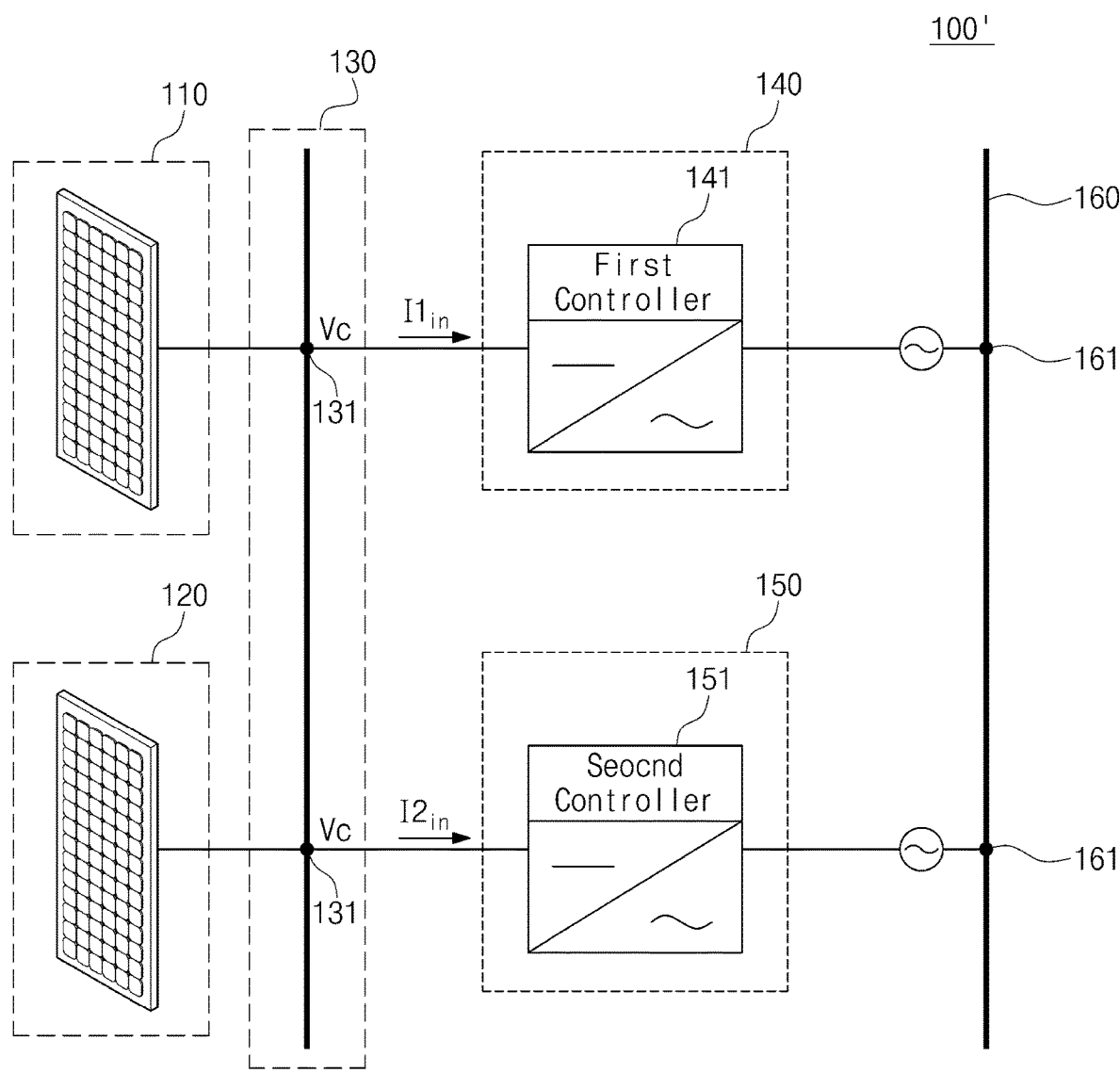
FIG. 2 shows an example of the implementation of the power conversion system of FIG. 1.

FIG. 2 shows an example of the implementation of the power conversion system of FIG. 1. Referring to FIGS. 1 and 2, a power conversion system 100' includes a first solar panel 110, a second solar panel 120, a DC bus line 130, a first inverter 140, a second inverter 150, and an AC grid power line 160. Since the first solar panel 110, the second solar panel 120, the DC bus line 130, the first inverter 140, and the second inverter 150 of the power conversion system 100' operates similarly to the first solar panel 110, the second solar panel 120, the DC bus line 130, the first inverter 140, and the second inverter 150 of the power conversion system 100 of FIG. 1, a detailed description thereof will be omitted.

As shown in FIG. 2, the first solar panel 110 and the second solar panel 120 are connected in parallel to the common terminal 131 of the DC bus line 130, and output DC power through the common terminal 131. The first inverter 140 and the second inverter 150 are connected in parallel to the common terminal 131 of the DC bus line 130 and may detect the voltage and current supplied from the common terminal 131. The first inverter 140 may detect the common terminal voltage Vc and the first input current I1in provided to the first inverter 140. The second inverter 150 may detect the common terminal voltage Vc and the second input current I2in provided to the second inverter 150. Based on the detection result, the first inverter 140 and the second inverter 150 may convert the DC power provided through the common terminal 131 to AC power.

The first inverter 140 may include a first controller 141. The first controller 141 may control the circuits in the first inverter 140 such that the first inverter 140 operates at the maximum power point. The second inverter 150 may include a second controller 151. The second controller 151 may control the circuits in the second inverter 150 so that the second inverter 150 operates at the maximum power point.

Each AC power generated according to the MPPT of the first inverter 140 and the second inverter 150 may be outputted to the common terminal 161 of the AC grid power line 160. Each of the first inverter 140 and the second inverter 150 measures the voltage, frequency, and phase of the generated AC power and matches the voltage, frequency, and phase of each AC power outputted to the AC grid power line 160.

Figure 3:
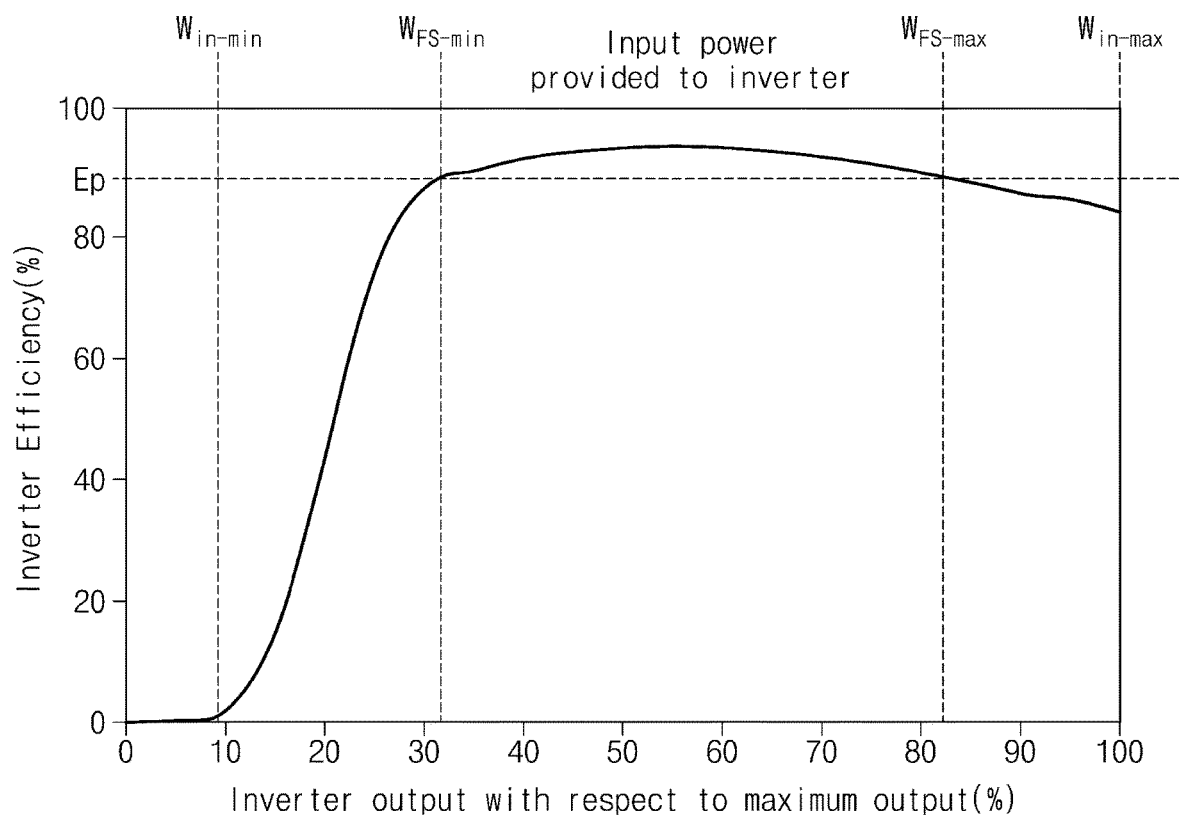
FIG. 3 is a graph showing the operation efficiency of the inverters of FIG. 1.

FIG. 3 is a graph showing the operation efficiency of the inverters of FIG. 1. Hereinafter, for convenience of description, FIG. 3 will be described with reference to the first inverter 140, but the inventive concept is not limited thereto.

Referring to FIG. 3, the first horizontal axis at the lower end represents the output of the first inverter 140 with respect to the maximum output that the first inverter 140 may output, and the second horizontal axis at the upper end represents the input power supplied to the inverter. The vertical axis represents the operation efficiency of the first inverter 140. The operation efficiency of the first inverter 140 may be calculated by the ratio of the output power to the input power. As shown in FIG. 3, the operation efficiency of the first inverter 140 is not constant and may vary depending on the output of the first inverter 140. Illustratively, when the output range of the first inverter 140 is about 30% to 80% with respect to the maximum output, the first inverter 140 may maintain operation efficiency of more than a specific efficiency.

When the minimum input power Win-min at which the first inverter 140 may continue to operate is provided to the first inverter 140, the output of the first inverter 140 may be about 10% of the maximum output, and the operation efficiency of the first inverter 140 may also be low. Illustratively, the minimum input power Win-min may be the same value as the minimum input power $W_{in\text{-}start}$ at which the first inverter 140 may start its normal operation in the stopped state.

The first inverter 140 may include information on a minimum input power $W_{FS\text{-}min}$ and a maximum input power $W_{FS\text{-}max}$ at which operation efficiency may be greater than a predetermined efficiency Ep. The output of the first inverter 140 with respect to the minimum input power $W_{FS\text{-}min}$ may be about 30% with respect to the maximum output and the output of the first inverter 140 with respect to the maximum input power $W_{FS\text{-}max}$ may be about 80% with respect to the maximum output. When converting power between the minimum input power $W_{FS\text{-}min}$ and the maximum input power $W_{FS\text{-}max}$ to AC power, the first inverter 140 may have an operation efficiency equal to or greater than a predetermined efficiency Ep. Therefore, the first inverter 140 may perform high-efficiency operation by using information on the minimum input power $W_{FS\text{-}min}$ and the maximum input power $W_{FS\text{-}max}$.

For example, when the power supplied to the first inverter 140 is a value between the minimum input power $W_{FS\text{-}min}$ and the maximum input power $W_{FS\text{-}max}$, the second inverter 150 may maintain the operation stop state. Accordingly, the first inverter 140 may have an operation efficiency equal to or greater than the predetermined efficiency Ep.

When the maximum input power $W_{in\text{-}max}$ at which the first inverter 140 may normally operate is provided to the first inverter 140, the output of the first inverter 140 may be the maximum output. When a power equal to or higher than the maximum input power $W_{in\text{-}max}$ is supplied to the first inverter 140, the first inverter 140 may generate AC power using only the acceptable power (i.e., the maximum input power $W_{in\text{-}max}$). In this case, the operation efficiency of the first inverter 140 may be lower than the predetermined efficiency Ep, and the operation efficiency of the first inverter 140 may be lowered. Accordingly, the first inverter 140 may operate such that the power inputted based on the information on the maximum input power $W_{FS\text{-}max}$ is not greater than the maximum input power $W_{FS\text{-}max}$.

For example, when the power supplied to the first inverter 140 exceeds twice the minimum input power $W_{FS\text{-}min}$ or becomes the maximum input power $W_{FS\text{-}max}$ of the first inverter 140, the second inverter 150 may start to operate. When the second inverter 150 starts to operate, the first input current supplied to the first inverter 140 may be reduced to ½. Accordingly, the power supplied to the first inverter 140 is not greater than the maximum input power $W_{FS\text{-}max}$, and the first inverter 140 may maintain high-efficiency operation.

Figure 4:
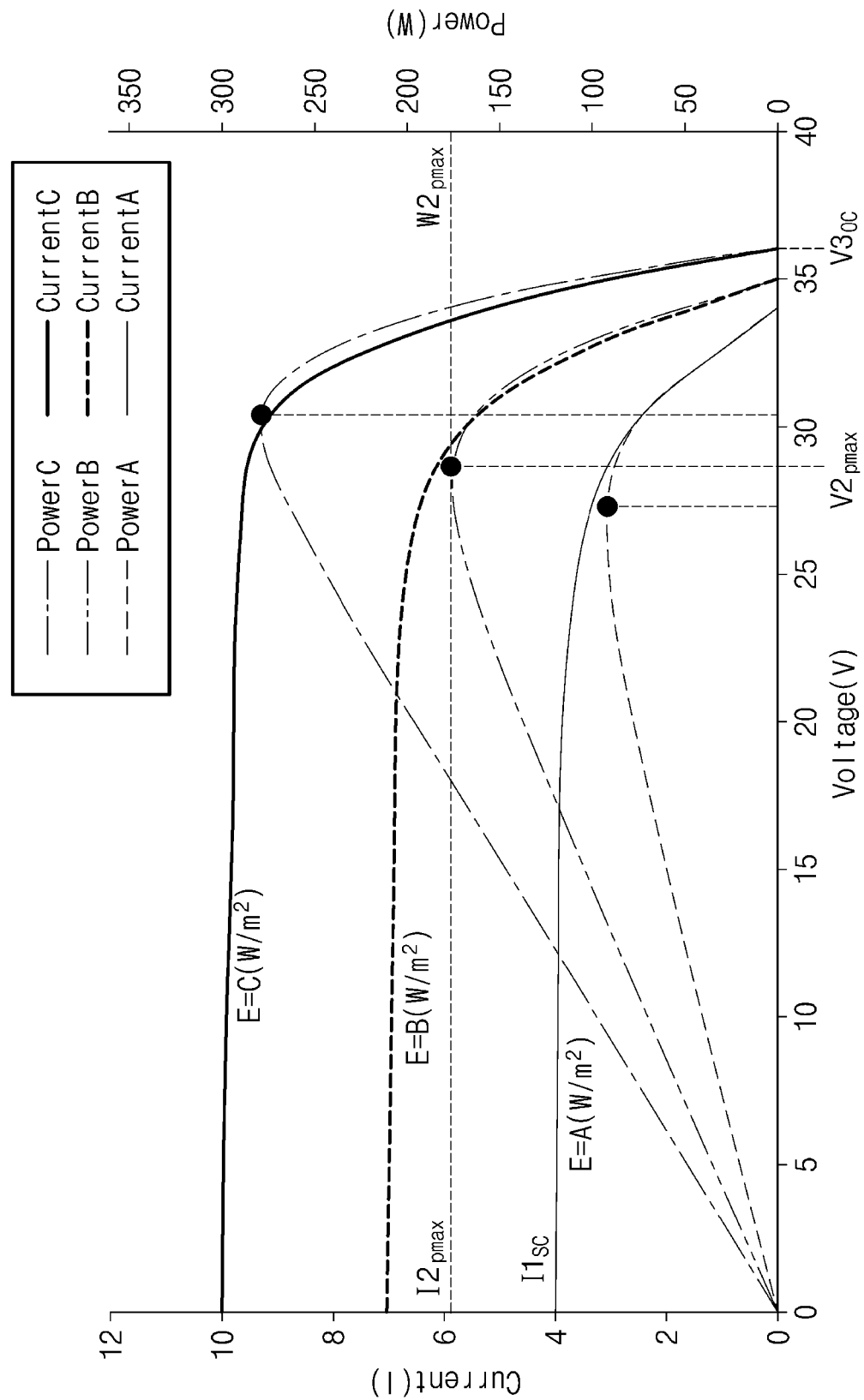
FIG. 4 is a graph showing an example for describing the MPPT of the inverters of FIG. 1.

FIG. 4 is a graph showing an example for describing the MPPT of the inverters of FIG. 1. Specifically, FIG. 4 shows the voltage-current and power output characteristics of the solar panels of FIG. 1. Hereinafter, for convenience of description, FIG. 4 will be described with reference to the first solar panel 110, but the inventive concept is not limited thereto.

Referring to FIG. 4, the horizontal axis represents voltage, the first vertical axis on the left side represents current, and the second vertical axis on the right side represents power. As shown in FIG. 4, the density E of the solar energy incident on the first solar panel 110 may vary according to time and weather conditions, and thus the output power of the first solar panel 110 may vary. When the density E of the incident solar energy is 'A', the current according to the voltage may be represented by the current A, and the output power of the first solar panel 110 corresponding thereto may be represented by the power A. When the density E of the incident solar energy is 'B', the current according to the voltage may be represented by the current B, and the output power of the first solar panel 110 corresponding thereto may be represented by the power B. When the density E of the incident solar energy is 'C', the current according to the voltage may be represented by the current C, and the output power of the first solar panel 110 corresponding thereto may be represented by the power C. In relation to the density E of the incident solar energy of FIG. 4, 'A' may be the smallest and 'C' may be the largest.

The open circuit voltage $V_{oc}$, the short circuit current Isc, and the maximum output power $W_{pmax}$ of the first solar panel 110 may vary depending on the density E of the solar energy. When the density E of incident solar energy is 'A', the short circuit current Isc of the first solar panel 110 may be a first short circuit current I1sc. As shown in FIG. 4, the short circuit current Isc of the first solar panel 110 may increase as the density E of the solar energy increases.

When the density E of incident solar energy is 'B', the maximum output power $W_{pmax}$ of the first solar panel 110 may be the second maximum output power $W2_{pmax}$. In this case, the input voltage at the maximum power point may be the second voltage $V2_{pmax}$, and the input current at the maximum power point may be the second current $I2_{pmax}$.

When the density E of incident solar energy is 'C', the open circuit voltage $V_{oc}$ of the first solar panel 110 may be a third open circuit voltage $V3_{oc}$. As shown in FIG. 4, the open circuit voltage $V_{oc}$ of the first solar panel 110 may increase as the density E of the solar energy increases.

The first and second inverters 140 and 150 may perform the MPPT to output the maximum power with respect to the input power. The first solar panel 110 outputs the maximum output power $W_{pmax}$ to the common terminal according to the MPPT of the first and second inverters 140 and 150, and the common terminal voltage and the common terminal current may be the maximum output voltage $V_{pmax}$ and the maximum output current $I_{pmax}$, respectively, corresponding to the maximum output power. Therefore, the common terminal voltage of the DC bus line 130 may be lowered to the maximum output voltage $V_{pmax}$ according to the operation of the first and second inverters 140 and 150 while maintaining the open circuit voltage $V_{oc}$.

As shown in FIG. 4, when the density E of the incident solar energy varies, since the maximum power point of the first solar panel 110 is changed, the maximum output power $W_{pmax}$ outputted from the first solar panel 110 may vary depending on the MPPT of the first and second inverters 140 and 150.

Figure 5:
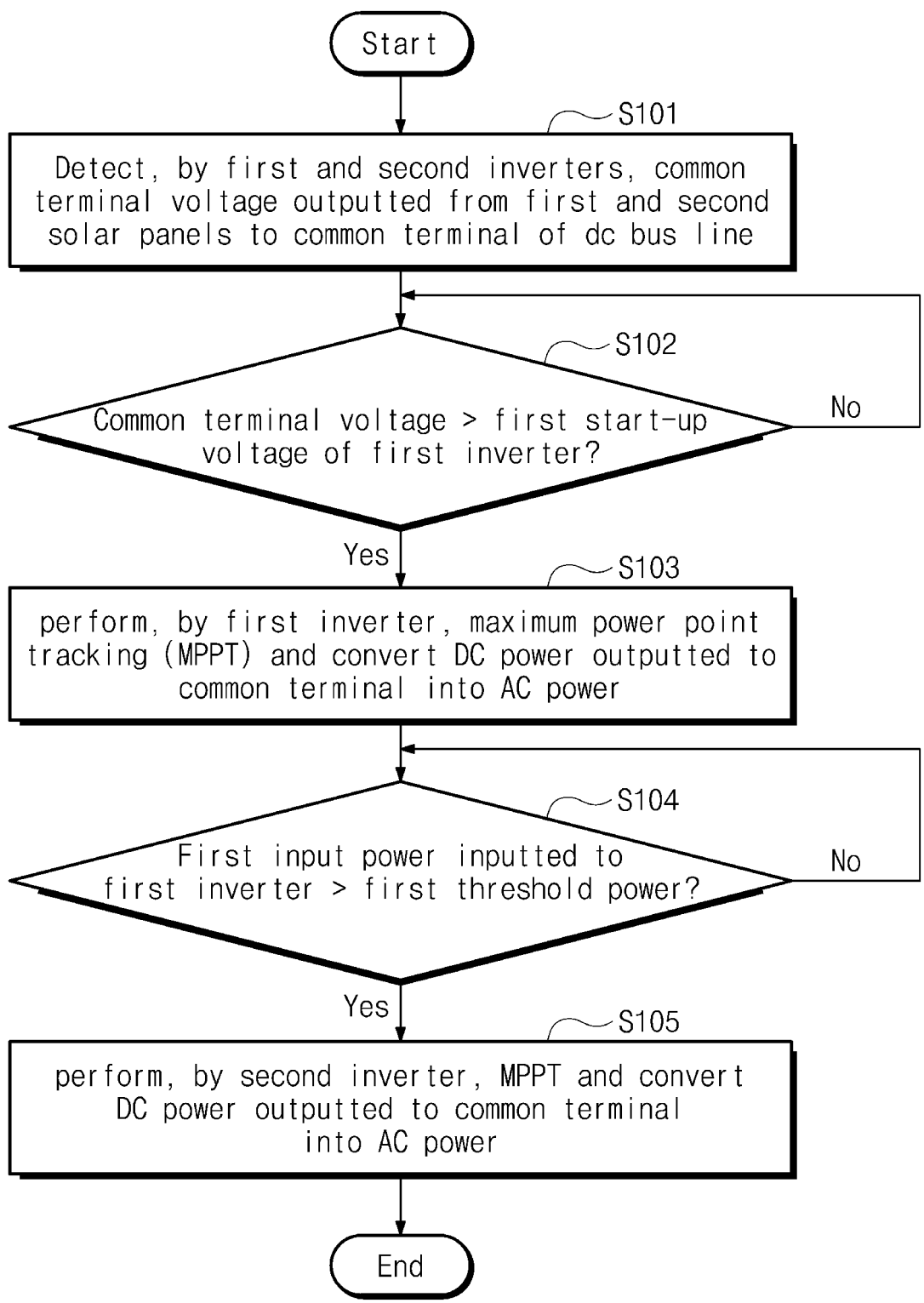
FIG. 5 is a flowchart illustrating an operation sequence of the power conversion system of FIG. 1 according to an embodiment of the inventive concept.

FIG. 5 is a flowchart showing an embodiment of an operation sequence of the power conversion system of FIG. 1. Referring to FIGS. 1 and 5, in operation S101, the first and second inverters 140 and 150 may detect the common terminal voltage outputted from the first and second solar panels 110 and 120 to the common terminal of the DC bus line 130. In operation S102, the first inverter 140 may determine whether the common terminal voltage becomes greater than a first start-up voltage $V1_{in\text{-}start}$ of the first inverter 140. When the common terminal voltage becomes larger than the first start-up voltage $V_{in\text{-}start}$ of the first inverter 140, in operation S103, the first inverter 140 performs MPPT and may convert the DC power outputted to the common terminal to AC power. When the first inverter 140 starts to operate, according to MPPT, the common terminal voltage of the DC bus line 130 may be lowered from the open circuit voltage $V_{oc}$ to the maximum output voltage $V_{pmax}$. In this case, the second inverter 150 may detect the start of the first inverter 140 by detecting that the common terminal voltage is lowered from the open circuit voltage $V_{oc}$ to the maximum output voltage $V_{pmax}$. When the common terminal voltage is not greater than the first start-up voltage $V1_{in\text{-}start}$ of the first inverter 140, the first inverter 140 may maintain the operation stop state.

When the first inverter 140 performs MPPT, the current outputted from each of the first solar panel 110 and the second solar panel 120 may be the maximum output current $I_{pmax}$, and the first input current inputted to the first inverter 140 through the common terminal may be twice the maximum output current $I_{pmax}$. Accordingly, the first inverter 140 may be provided with twice the input power as compared with the case where only one solar panel is connected, so that the operation efficiency of the first inverter 140 may be improved.

In operation S104, the second inverter 150 may determine whether the first input power supplied to the first inverter 140 is greater than the first threshold power. The first threshold power may be the magnitude of the input power that may be maintained above a specified efficiency while the first inverter 140 is operating alone. The second inverter 150 may store the first threshold power value in advance. For example, the first threshold power may be twice the minimum input power $W_{FS\text{-}min}$ or the maximum input power $W_{FS\text{-}max}$ of FIG. 3.

The second inverter 150 may calculate the magnitude of the first input power based on the common terminal voltage and the output characteristic of the solar panel of FIG. 4. For example, under the assumption that the first inverter 140 normally performs the MPPT function, the second inverter 150 may calculate the magnitude of the first input power as the maximum output power corresponding to the common terminal voltage.

When the first input power is greater than the first threshold power, in operation S105, the second inverter 150 performs MPPT and may convert the DC power outputted to the common terminal to AC power.

When the first input power is not greater than the first threshold power, the second inverter 150 may maintain an operation stop state.

When the second inverter 150 starts to operate, the common terminal current temporarily increases, and the common terminal voltage may be temporarily lowered. That is, when only the first inverter 140 operates, the common terminal current may be twice the maximum output current $I_{pmax}$, and the common terminal voltage may be the maximum output voltage $V_{pmax}$. However, due to the start of operation of the second inverter 150, the common terminal current temporarily increases, and the common terminal voltage may be temporarily lowered. When the first inverter 140 and the second inverter 150 operate individually, the common terminal voltage may be restored to the maximum output voltage $V_{pmax}$ by MPPT, and the common terminal current may be restored to twice the maximum output current $I_{pmax}$. In addition, each current inputted to the first inverter 140 and the second inverter 150 may be the maximum output current $I_{pmax}$.

Accordingly, when the power outputted from the first solar panel 110 and the second solar panel 120 is large, each of the first inverter 140 and the second inverter 150 may receive the input power obtained by dividing the output power. The power provided to the first inverter 140 and the second inverter 150 may be greater than the minimum input power $W_{FS-min}$ of FIG. 3. Accordingly, the operation efficiency of the first and second inverters 140 and 150 may be improved.

Figure 6:
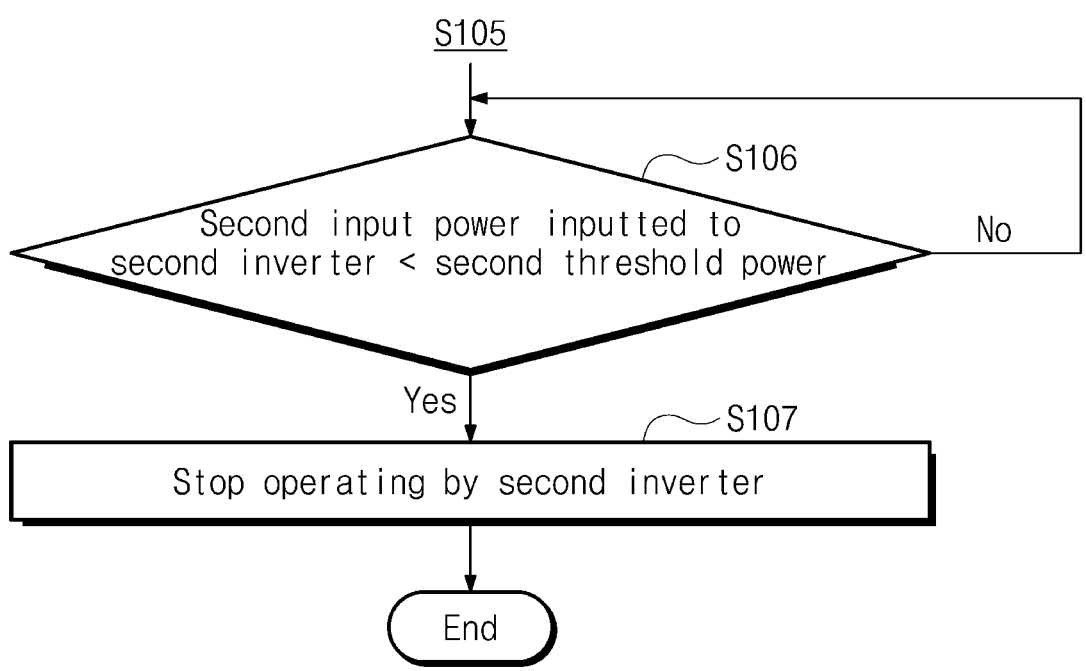
FIG. 6 is a flowchart showing another embodiment of an operation sequence of the power conversion system of FIG. 1.

According to what is shown in FIG. 5, the first inverter 140 may perform an integrated operation based on the common terminal voltage. Thereafter, when the power supplied from the common terminal to the first inverter 140 increases, the first inverter 140 and the second inverter 150 may perform an individual operation. When the first inverter 140 and the second inverter 150 perform an individual operation, the operation efficiency of the first inverter 140 and the second inverter 150 may be improved. FIG. 6 is a flowchart showing another embodiment of an operation sequence of the power conversion system of FIG. 1. Referring to FIGS. 1, 5 and 6, after operation S105 of FIG. 5, in operation S106, the second inverter 150 may determine whether the second input power provided to the second inverter 150 is less than the second threshold power. While the first inverter 140 and the second inverter 150 operate separately, the second threshold power may be the magnitude of the input power at which the second inverter 150 may maintain a specific efficiency or more. The second inverter 150 may store the second threshold power value in advance. For example, the second threshold power may be the minimum input power $W_{FS-min}$ of FIG. 3.

The second inverter 150 may calculate the magnitude of the second input power based on the common terminal voltage and the second input current. Alternatively, the second inverter 150 may calculate the magnitude of the common terminal current and the second input power based on the common terminal voltage and the output characteristic of the solar panel of FIG. 4.

When the second input power is smaller than the second threshold power, in operation S107, the second inverter 150 may stop the operation. When the second inverter 150 stops to operate, the common terminal current may be temporarily decreased at twice the maximum output current $I_{pmax}$, and the common terminal voltage may be temporarily raised at the maximum output voltage $V_{pmax}$. Thereafter, by the MPPT of the first inverter 140, the common terminal voltage may be restored to the maximum output voltage $V_{pmax}$ and the common terminal current may be restored to twice the maximum output current $I_{pmax}$.

When the second input power is not smaller than the second threshold voltage, the second inverter 150 may maintain the operation state.

As shown in FIG. 6, the second inverter 150 performing the individual operation may stop the operation when the power supplied to the second inverter 150 becomes smaller than the second threshold power, and accordingly, the first inverter 140 may perform an integrated operation. When the first and second inverters 140 and 150 switch from individual operation to integrated operation based on the magnitude of the provided power, high efficiency operation may be maintained.

Figure 7:
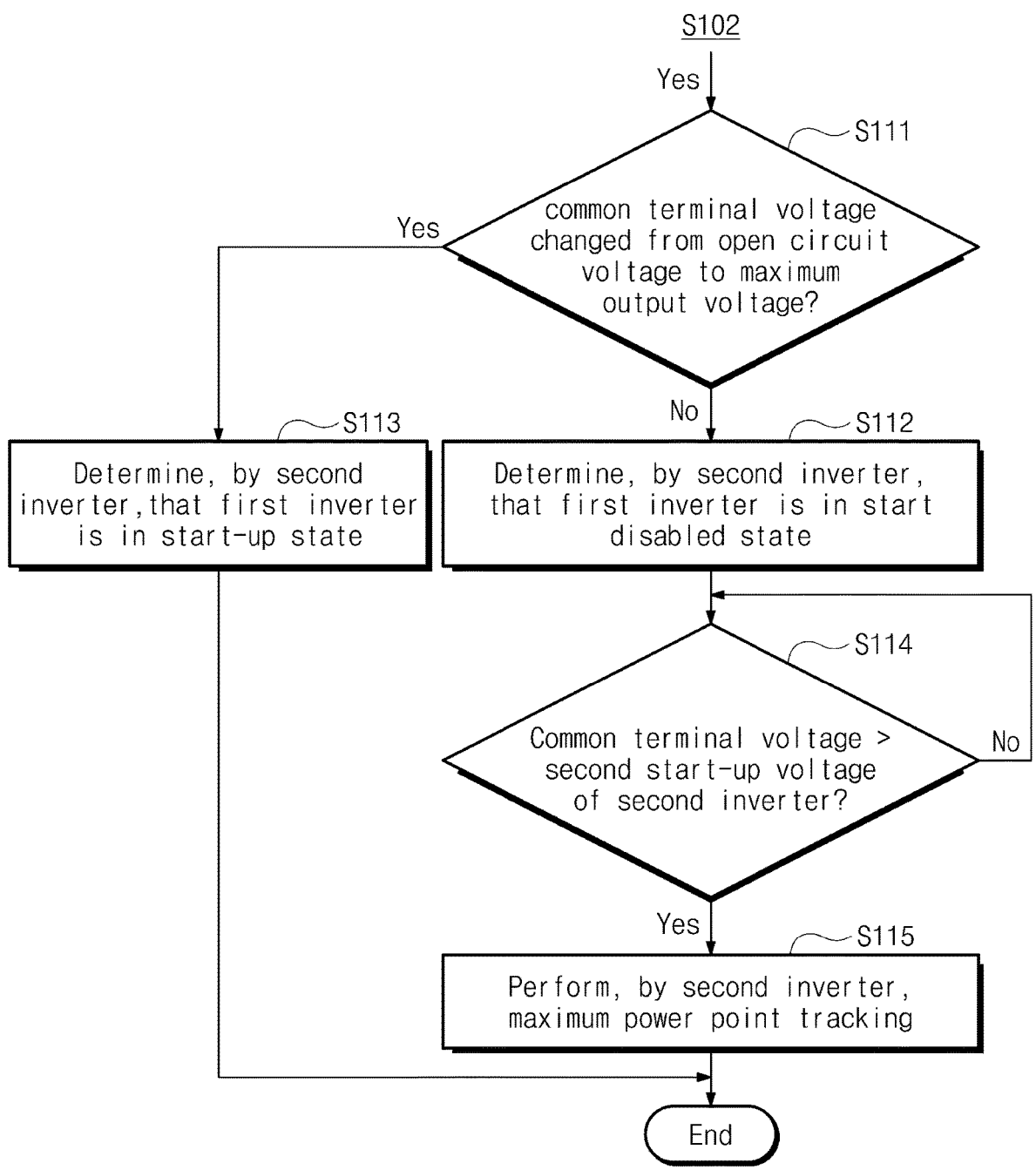
FIG. 7 is a flowchart showing another embodiment of an operation sequence of the power conversion system of FIG. 1.

FIG. 7 is a flowchart showing another embodiment of an operation sequence of the power conversion system of FIG. 1. Referring to FIGS. 1, 5 and 7, when it is determined in operation S102 of FIG. 5 that the common terminal voltage is greater than the first start-up voltage $V1_{in\text{-}start}$ of the first inverter, in operation S111, the second inverter 150 may determine whether the common terminal voltage is changed from the open circuit voltage $V_{oc}$ to the maximum output voltage $V_{pmax}$. When the first inverter 140 starts normally and performs the MPPT, the common terminal voltage may be lowered to the maximum output voltage $V_{pmax}$. When the first inverter 140 becomes a start disabled state due to a failure or the like and may not perform MPPT, the common terminal voltage may continue to maintain the open circuit voltage $V_{oc}$.

When the common terminal voltage is not lowered to the maximum output voltage $V_{pmax}$, the second inverter 150 may determine that the first inverter 140 is in a start disabled state in operation S112. When the common terminal voltage is lowered to the maximum output voltage $V_{pmax}$, the second inverter 150 may determine that the first inverter 140 is in the start state.

In operation S112, when the second inverter 150 determines that the first inverter 140 is in the start disabled state, in operation S114, the second inverter 150 may determine whether the common terminal voltage is greater than a second start-up voltage $V2_{in\text{-}start}$ of the second inverter 150. When the common terminal voltage is greater than the second start-up voltage $V2_{in\text{-}start}$, the second inverter 150 may perform MPPT in operation S115. The second inverter 150 performs an operation to convert the DC power outputted to the common terminal to AC power. When the common terminal voltage is not greater than the second start-up voltage $V2_{in\text{-}start}$, the second inverter 150 may maintain the operation stop state.

The first inverter 140 and the second inverter 150 according to the embodiment of the inventive concept may determine the operation states of other inverters through monitoring of the common terminal without performing separate communication. The first inverter 140 and the second inverter 150 may determine the operation states of other inverters in the manner shown in Table 1 below.

TABLE 1

| Condition | Determination result |
|---|---|
| When the common terminal voltage maintains the maximum output voltage $V_{pmax}$ and becomes higher than the maximum output voltage $V_{pmax}$ for a predetermined time | One of the first and second inverters stops operating |
| When the input current inputted to any one of the first and second inverters is doubled | The other one of the first and second inverters stops operating |
| When the common terminal voltage maintains the maximum output voltage $V_{pmax}$ and | One of the first and second inverters starts to operate |

TABLE 1-continued

| Condition | Determination result |
|---|---|
| becomes lower than the maximum output voltage $V_{pmax}$ for a predetermined time | |
| When the input current inputted to any one of the first and second inverters is 1/2 | The other one of the first and second inverters starts to operate |
| When the input power provided to the first inverter exceeds the threshold power and the common terminal voltage is maintained as the threshold voltage | It is determined that the second inverter is unable to start |
| When the common terminal voltage is higher than the first start-up voltage $V1_{in\text{-}start}$ of the first inverter and the common terminal voltage is not lowered from the open circuit voltage to the maximum output voltage $V_{pmax}$ | It is determined that the first inverter is unable to start |

Referring to Table 1, the first inverter 140 and the second inverter 150 detect changes in the magnitude of the common terminal voltage, the current inputted to each inverter, and the power, and determine the operation state of the other inverter based on the result of the detection. The first inverter 140 and the second inverter 150 may determine the operation stop, operation start, and start disabled states of the other inverters.

When the input power provided to the first inverter 140 exceeds the threshold power and the common terminal voltage is maintained at the threshold voltage, the first inverter 140 may determine that the second inverter 150 is disabled to start. For example, the threshold power may be the maximum input power $W_{FS\text{-}max}$ of FIG. 3 and the threshold voltage may be the input voltage $V_{FS\text{-}max}$ at the maximum input power $W_{FS\text{-}max}$. When the input power supplied to the first inverter 140 reaches the maximum input power $W_{FS\text{-}max}$ and the second inverter 150 starts to operate, the input power supplied to the first inverter 140 is lowered, and thus the common terminal voltage may be changed. Accordingly, the first inverter 140 may determine whether the second inverter 150 normally operates based on the magnitudes of the input power and the common terminal voltage.

Figure 8:
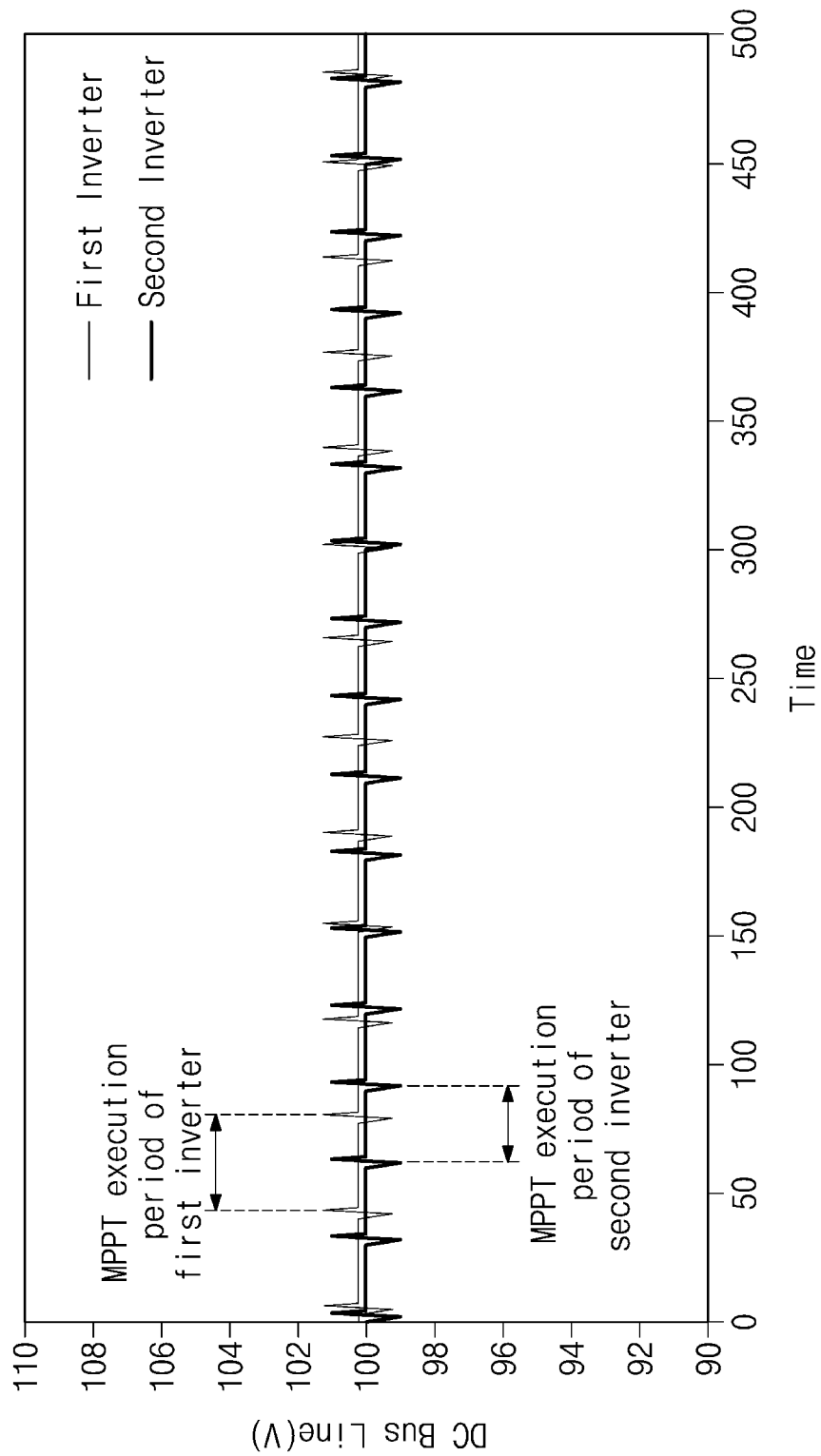
FIG. 8 is a view for explaining an embodiment for avoiding mutual interference according to the MPPT of an inverter according to an embodiment of the inventive concept.

FIG. 8 is a view for explaining an embodiment for avoiding mutual interference according to the MPPT of an inverter according to an embodiment of the inventive concept. Referring to FIG. 8, the horizontal axis represents time, and the vertical axis represents a common terminal voltage of the DC bus line 130. The first inverter 140 and the second inverter 150 may perform MPPT according to a predetermined period. When one of the first inverter 140 and the second inverter 150 performs MPPT, as shown in FIG. 8, the variation of the common terminal voltage of the DC bus line 130 may be large.

When one of the first inverter 140 and the second inverter 150 performs the MPPT and the other performs the MPPT simultaneously, the MPPT may be problematic due to mutual interference according to voltage variation. This may be a problem occurring when the first inverter 140 and the second inverter 150 are connected directly through the common terminal of the DC bus line 130.

As shown in FIG. 8, when the execution period of the MPPT of the first inverter 140 and the execution period of the MPPT of the second inverter 150 are to be relatively prime, the influence of one MPPT on the other MPPT may be minimized.

Figure 9:
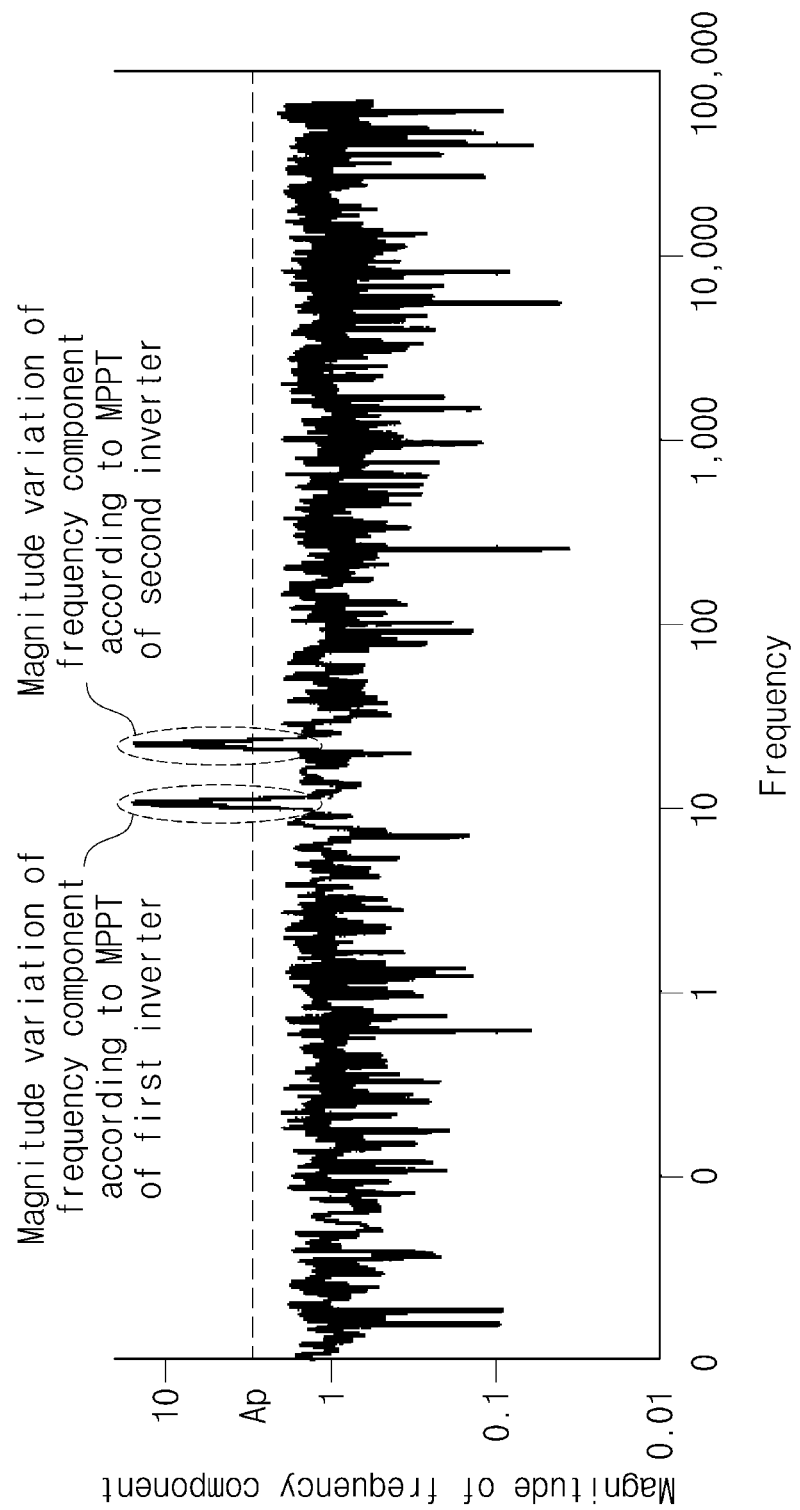
FIG. 9 is a view for explaining another embodiment for avoiding mutual interference according to the MPPT of an inverter according to an embodiment of the inventive concept.

FIG. 9 is a view for explaining another embodiment for avoiding mutual interference according to the MPPT of an inverter according to an embodiment of the inventive concept. Referring to FIG. 9, the horizontal axis represents frequency and the vertical axis represents the magnitude of a frequency component. Specifically, FIG. 9 shows the common terminal voltage detected in the frequency domain. As shown in FIG. 9, when the first inverter 140 and the second inverter 150 perform MPPT, the magnitude of the specific frequency component of the common terminal voltage may change to a predetermined magnitude Ap or more according to the variation of the common terminal voltage. Each of the first inverter 140 and the second inverter 150 may detect the magnitude variation of a frequency component that is changed more than the predetermined magnitude Ap.

Each of the first inverter 140 and the second inverter 150 may store information on the execution period of MPPT of different inverters. When the first inverter 140 and the second inverter 150 detect the magnitude variation of the frequency component at a specific time and based on this, detect the magnitude variation of the frequency component corresponding to the execution period of MPPT, it may be determined that the magnitude variation of the frequency component is generated by the MPPT of another inverter.

When the magnitude variation of a frequency component occurs by MPPT, the first inverter 140 and the second inverter 150 may not perform any operation. That is, the first inverter 140 and the second inverter 150 may continuously perform the MPPT according to the pre-stored execution period. When the magnitude variation of the frequency component is not generated by MPPT, the first inverter 140 and the second inverter 150 may separately perform the MPPT regardless of the pre-stored execution period.

FIG. 10 is a view illustrating an embodiment for an operation sequence of a power conversion system related to mutual interference avoidance of FIG. 9. Referring to FIGS. 1, 5, and 9, the first inverter 140 and the second inverter 150 may perform MPPT according to operation S105. In operation S121, the first inverter 140 and the second inverter 150 may determine whether the magnitude of the frequency component of the common terminal voltage is larger than the magnitude of the predetermined frequency component. When the magnitude of the frequency component of the common terminal voltage is larger than the magnitude of the preset frequency component, in operation S122, the first inverter 140 and the second inverter 150 may determine whether the magnitude variation of the frequency component corresponds to MPPT. When the magnitude variation of the frequency component occurs in correspondence to the execution period of MPPT, the first inverter 140 and the second inverter 150 may determine that the magnitude variation of the frequency component is related to the MPPT. When the magnitude variation of the frequency component is related to MPPT, the first inverter 140 and the second inverter 150 may not perform any operation. When the magnitude variation of the frequency component is not related to MPPT, the first inverter 140 and the second inverter 150 may perform MPPT. When MPPT is performed, the common terminal voltage may be restored to the maximum output voltage $V_{pmax}$.

The interference avoiding operation of the power conversion system 100 is just one embodiment, and the inventive concept is not limited thereto. For example, the power conversion system 100 may randomly set the execution period of the MPPT of each of the first inverter 140 and the second inverter 150 to perform the interference avoiding operation.

The power conversion system 100 according to an embodiment of the inventive concept delivers the power outputted from the first and second solar panels 110 and 120 to the first inverter 140 and the second inverter 140 through the DC bus line 130, so that the switching of the integrated operation or the individual operation of the first and second inverters 140 and 150 may be easily implemented. In addition, the first and second inverters 140 and 150 may detect the common terminal voltage of the DC bus line 130 to improve the operation efficiency of each inverter and based on the detection result, automatically determine operation start or operation stop.

The power conversion system according to an embodiment of the inventive concept may improve the operation efficiency of the inverters without changing the hardware structure of the existing MIC.

In addition, the inventive concept may provide an operation method of a power conversion system that may effectively remove mutual interference generated according to an operation of an inverter.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A power conversion system comprising:
   a DC bus line including a common terminal;
   a power generation device configured to provide DC power to the common terminal;
   a first inverter configured to convert a first input power provided from the common terminal into a first AC power and output the first AC power; and
   a second inverter configured to convert a second input power provided from the common terminal into a second AC power in response to the first input power being greater than a first threshold power while the first inverter operates and output the second AC power,
   wherein the first inverter performs a maximum power point tracking (MPPT) by detecting a common terminal voltage and a first input current provided from the common terminal, and
   wherein the second inverter performs the MPPT by detecting the common terminal voltage and a second input current provided from the common terminal.

2. The power conversion system of claim 1, wherein when the second input power is smaller than a second threshold power while the first and second inverters operate, the second inverter stops operating.

3. The power conversion system of claim 1, wherein a first start-up voltage of the first inverter is set to be lower than a second start-up voltage of the second inverter.

4. The power conversion system of claim 1, wherein the first inverter starts before the second inverter.

5. The power conversion system of claim 1, wherein when the common terminal voltage is higher than a maximum output voltage during a predetermined time or when one of the first and second input currents is increased to a specific magnitude, one of the first and second inverters determines that another one of the first and second inverters stops operating.

6. The power conversion system of claim 1, wherein when the common terminal voltage is lower than a maximum output voltage during a predetermined time or when one of the first and second input currents is decreased to a specific magnitude, one of the first and second inverters determines that another one of the first and second inverters starts operating in a stop state.

7. The power conversion system of claim 1, wherein when the common terminal voltage is higher than a first start-up voltage of the first inverter and the common terminal voltage is not changed from an open circuit voltage to a maximum output voltage, the second inverter determines that the first inverter is start-disabled.

8. The power conversion system of claim 1, wherein when the first input power exceeds a second threshold power and the common terminal voltage is maintained at a threshold voltage, the first inverter determines that the second inverter is start-disabled.

9. The power conversion system of claim 1, wherein an execution period of the MPPT of the first inverter and an execution period of the MPPT of the second inverter are relatively prime.

10. The power conversion system of claim 1, wherein at least one of the first and second inverters determines a variation of the common terminal voltage corresponding to the MPPT based on each execution period of the MPPT, and does not perform any operation in response to the variation.

11. The power conversion system of claim 1, wherein the power generation device is a solar panel.

12. An operation method of a power conversion system including a first inverter and a second inverter, the method comprising:
   detecting, by the first inverter and the second inverter, a common terminal voltage provided to a common terminal of a DC bus line from a power generating device;
   converting, by the first inverter, a first input power provided from the common terminal into a first AC power and outputting the first AC power according to the common terminal voltage; and
   converting, by the second inverter, a second input power provided from the common terminal into a second AC power and outputting the second AC power in response to the first input power being greater than a first threshold power while the first inverter operates,
   wherein the first and second inverters perform maximum power point tracking (MPPT) to output the first AC power and the second AC power, respectively.

13. The method of claim 12, wherein the first threshold power is twice a minimum power at which the first inverter operates with more than a predetermined efficiency or is a maximum power at which the first inverter operates with more than the predetermined efficiency.

14. The method of claim 12, further comprising, when the second input power is smaller than a second threshold power, stopping, by the second inverter, operating.

15. The method of claim 14, wherein the second threshold power is a minimum power at which the second inverter operates with more than a predetermined efficiency.

16. The method of claim 12, wherein an execution period of the MPPT of the first inverter and an execution period of the MPPT of the second inverter are relatively prime.

17. The method of claim 12, further comprising:
   determining, by at least one of the first and second inverters, a magnitude of a frequency component of the common terminal voltage;
   when the magnitude of the frequency component of the common terminal voltage is greater than a magnitude of a predetermined frequency component, determining, by at least one of the first and second inverters, whether a magnitude variation of the frequency component corresponds to the MPPT; and
   when the magnitude variation of the frequency component does not correspond to the MPPT, performing, by at least one of the first and second inverters, the MPPT regardless of an execution period of the MPPT.

18. A power conversion system comprising:
   a DC bus line including a common terminal;
   a power generation device configured to provide DC power to the common terminal;
   a first inverter configured to convert a first input power provided from the common terminal into a first AC power and output the first AC power; and
   a second inverter configured to convert a second input power provided from the common terminal into a second AC power in response to the first input power being greater than a first threshold power while the first inverter operates and output the second AC power,
   wherein a first start-up voltage of the first inverter is set to be lower than a second start-up voltage of the second inverter.

* * * * *